(12) United States Patent
Arora et al.

(10) Patent No.: US 9,569,641 B2
(45) Date of Patent: Feb. 14, 2017

(54) DATA PROCESSING SYSTEM WITH TEMPERATURE MONITORING FOR SECURITY

(71) Applicant: FREESCALE SEMICONDUCTOR, INC., Austin, TX (US)

(72) Inventors: Mohit Arora, Austin, TX (US); Prashant Bhargava, Austin, TX (US); Simon J. Gallimore, Austin, TX (US); Dale J. McQuirk, Austin, TX (US); Charles E. Seaberg, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/667,303

(22) Filed: Mar. 24, 2015

(65) Prior Publication Data

US 2016/0283751 A1    Sep. 29, 2016

(51) Int. Cl.
| | | |
|---|---|---|
| *G06F 21/00* | (2013.01) | |
| *G06F 21/86* | (2013.01) | |
| *G01K 3/00* | (2006.01) | |
| *G01R 31/317* | (2006.01) | |
| *G06F 21/55* | (2013.01) | |
| *G06F 21/71* | (2013.01) | |
| *G06F 21/75* | (2013.01) | |

(Continued)

(52) U.S. Cl.
CPC .............. *G06F 21/86* (2013.01); *G01K 3/005* (2013.01); *G01R 31/31719* (2013.01); *G06F 21/558* (2013.01); *G06F 21/71* (2013.01); *G06F 21/75* (2013.01); *G06F 21/81* (2013.01)

(58) Field of Classification Search
CPC .......... G06F 21/71; G06F 21/75; G06F 21/78; G06F 21/558; G06F 21/72; G06F 21/86; G06F 21/79; G06F 21/70; G06F 21/76; G06F 21/00; G06F 21/55; G06F 1/28; G06F 21/81; G01K 3/005; G01R 31/31719; G06Q 2220/16; G07G 3/003; H04L 2209/12; H04L 63/1416; H04L 9/002; H04W 12/12
See application file for complete search history.

(56) References Cited

U.S. PATENT DOCUMENTS

| | | |
|---|---|---|
| 5,185,717 A | 2/1993 | Mori |
| 5,239,664 A | 8/1993 | Verrier et al. |

(Continued)

FOREIGN PATENT DOCUMENTS

| | | |
|---|---|---|
| EP | 0369934 A2 | 5/1990 |
| EP | 1031929 A2 | 8/2000 |

(Continued)

OTHER PUBLICATIONS

Maxim Integrated. "Embedded Security Product Guide", 2nd ed., May 2013.*

(Continued)

*Primary Examiner* — Michael Simitoski

(57) ABSTRACT

A processing system includes a processor and a temperature security module coupled to provide a temperature tamper signal to the processor. The temperature security module includes a shelf mode trim value, an operating mode trim value, and a programmable temperature trim value. One of the programmable temperature trim value, the shelf mode trim value, and the operating mode trim value, is used based on a deployment mode of the processing system to set a temperature monitor trim value.

15 Claims, 4 Drawing Sheets

(51) Int. Cl.
*G06F 21/81* (2013.01)
*H04W 24/00* (2009.01)
*G01K 1/08* (2006.01)

(56) References Cited

U.S. PATENT DOCUMENTS

| | | |
|---|---|---|
| 6,288,638 B1 | 9/2001 | Tanguay et al. |
| 6,549,053 B1 | 4/2003 | Evans et al. |
| 6,600,639 B1 | 7/2003 | Teo et al. |
| 6,750,683 B2 | 6/2004 | McClure et al. |
| 7,030,793 B2 | 4/2006 | McLeod et al. |
| 7,362,248 B2 | 4/2008 | McClure et al. |
| 7,549,796 B2 * | 6/2009 | Nam ................ G01K 7/00 327/512 |
| 7,734,440 B2 * | 6/2010 | Hattis ............... G01K 3/14 702/104 |
| 9,299,451 B2 * | 3/2016 | Hebig ............. G11C 17/16 |
| 2002/0021590 A1 | 2/2002 | Lammers et al. |
| 2003/0118079 A1 | 6/2003 | Marinet et al. |
| 2003/0149914 A1 * | 8/2003 | Kim ............... G06K 19/073 714/30 |
| 2004/0113783 A1 * | 6/2004 | Yagesh ............ G06Q 10/08 340/568.1 |
| 2004/0252628 A1 * | 12/2004 | Detzler ............ G06F 21/554 369/288 |
| 2005/0275408 A1 | 12/2005 | Houldsworth et al. |
| 2007/0069875 A1 * | 3/2007 | Doi ................. G06F 21/75 340/440 |
| 2007/0124409 A1 * | 5/2007 | Sibert ............. G06F 12/145 709/216 |
| 2007/0216468 A1 * | 9/2007 | Duarte ............. G01K 3/005 327/513 |
| 2007/0237325 A1 * | 10/2007 | Gershowitz ....... G06F 21/72 380/30 |
| 2007/0255966 A1 * | 11/2007 | Condorelli ........ G06F 21/87 713/194 |
| 2007/0266447 A1 * | 11/2007 | Hollander ........ G06F 21/32 726/34 |
| 2008/0028247 A1 * | 1/2008 | Muraoka ............ G06F 1/30 713/340 |
| 2010/0083730 A1 * | 4/2010 | Le ................. G01K 3/005 73/1.02 |
| 2010/0332851 A1 * | 12/2010 | Priel ............... G06F 21/554 713/189 |
| 2012/0201379 A1 * | 8/2012 | Fuchs ............. H04L 9/0877 380/255 |
| 2013/0157702 A1 * | 6/2013 | Di Luoffo ......... H04W 12/04 455/500 |
| 2013/0158936 A1 * | 6/2013 | Rich .............. G01K 13/00 702/130 |
| 2014/0035560 A1 * | 2/2014 | Olmos ......... G01R 31/31719 324/76.41 |
| 2014/0155027 A1 | 6/2014 | Priel et al. |
| 2014/0337642 A1 * | 11/2014 | Takahashi ........ H04L 9/0877 713/194 |
| 2015/0052622 A1 * | 2/2015 | Cabler ............. G06F 21/558 726/34 |
| 2015/0113285 A1 * | 4/2015 | Boivie ............ H04L 9/3247 713/189 |
| 2015/0254677 A1 * | 9/2015 | Huxham ......... G06K 19/0709 705/57 |

FOREIGN PATENT DOCUMENTS

| | | |
|---|---|---|
| EP | 1074009 B1 | 3/2002 |
| EP | 1788579 A1 | 5/2007 |
| EP | 2613321 A2 | 7/2013 |
| EP | 2257879 B1 | 11/2013 |
| WO | 0180739 A1 | 11/2001 |

OTHER PUBLICATIONS

Extended European Search Report for European Patent Appl. No. 116162724.6 dated Aug. 4, 2016.

* cited by examiner

DATA PROCESSING SYSTEM WITH TEMPERATURE MONITORING FOR SECURITY

BACKGROUND

Field

This disclosure relates generally to data processing systems, and more specifically, to data processing systems with temperature monitoring for security.

Related Art

System on Chip (SoC) manufacturers typically guarantee proper operation within a specified temperature range. Outside this temperature range, the SoC may no longer operate correctly and may be susceptible to hackers. For example, if the temperature of an SoC is lowered to be lower than the operating temperature range, the contents of the memory may be accessed by unsecure software since device operation is not guaranteed in that range. Therefore, SoCs may include temperature monitors which indicate when a temperature of the SoC has reached a temperature outside of the specified temperature range. If the temperature has reached a lower or higher temperature than the specified range, a signal is generated which may be used to indicate that the SoC was possibly hacked. However, the temperature ranges provided by a manufacturer are typically fixed and they may therefore not be suitable for a customer's needs. If the ranges are incorrect, the signal may not provide an effective way to indicate a possible hacking of the SoC. For example, the signal may provide too many false positives. Therefore, a need exists for improved temperature-based tamper detection.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A temperature security module of an SoC is capable of operating in a normal operating mode and in a shelf mode. An SoC manufacturer programs an operating mode trim value into the temperature security module which indicates a valid temperature range during operating mode. During operating mode, if a temperature of the SoC goes beyond the valid temperature range, the temperature security module asserts a temperate tamper signal. Once a customer receives an SoC from a manufacturer, the customer is able to determine whether the operating mode trim value provided by the manufacturer meets the requirements needed by the customer for appropriately asserting a temperature tamper signal. In some cases, a customer may require a trim value which further restricts a valid temperature range of the SoC provided by the manufacturer. Therefore, in one embodiment, programmable elements are provided which allow a customer to override the values provided by the manufacturer.

The SoC manufacturer also programs a shelf mode trim value into the temperature security module which is used to indicate a temperature range during shelf mode which is greater than the valid temperature range during operating mode. In shelf mode, behavior of the temperature tamper signal is modified to allow the SoC to be initially exposed to extreme temperatures outside the valid temperature range without resulting in assertion of the temperature tamper signal. Upon placement of the SoC into use in the field, operating mode is enabled and shelf mode is permanently disabled. During operating mode, the temperature of the SoC can no longer go beyond the valid temperature range without resulting in assertion of the temperature tamper signal. In this manner, customers may be provided with improved flexibility and yield while still maintaining appropriate levels of temperature-based security.

Figure 1:
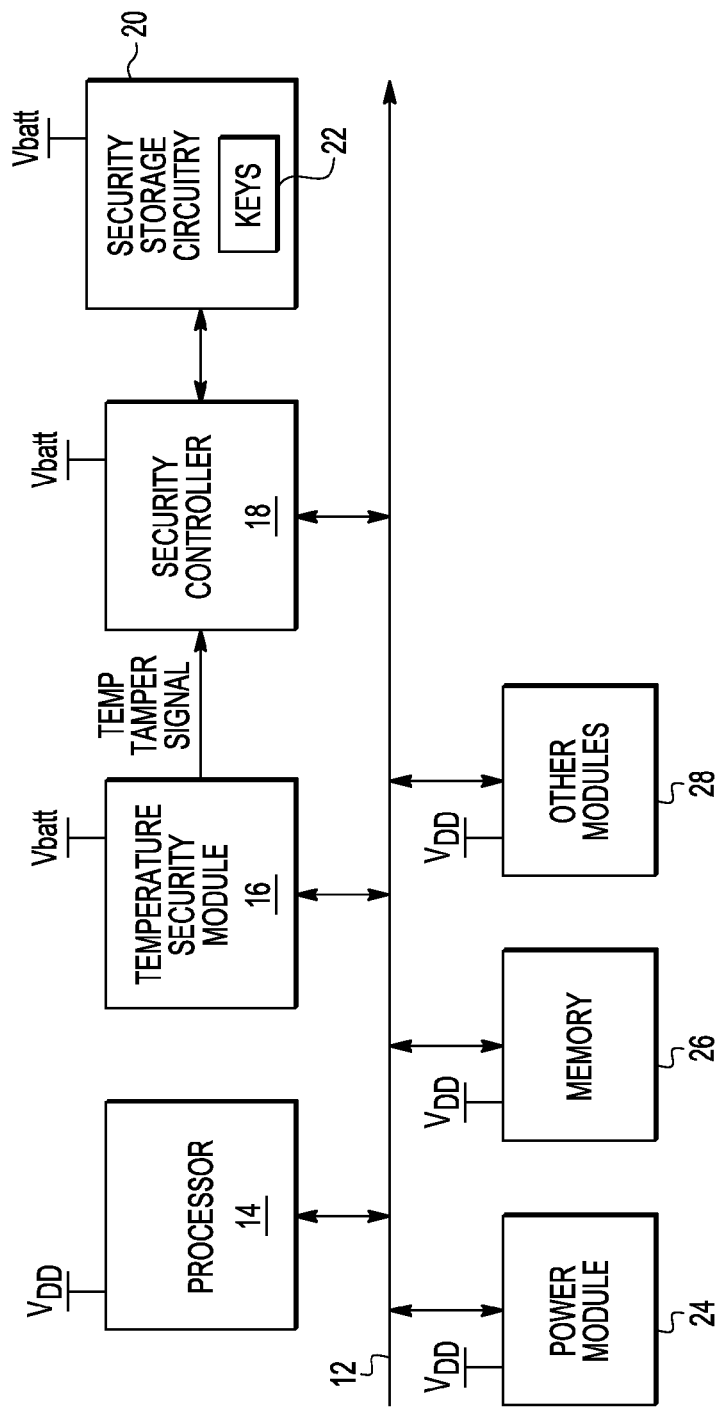
FIG. 1 illustrates, in block diagram form, a data processing system in accordance with one embodiment of the present invention.

FIG. 1 illustrates, in block diagram form, a data processing system 10 in accordance with one embodiment of the present invention. System 10 may be an SoC in which all modules are located on a same integrated circuit die. System 10 includes a processor 14, an interconnect 12, a power module 24, a memory 26, other modules 28, a temperature security module 16, a security controller 18, and secure storage circuitry 20. Secure storage circuitry 20 is configured to store sensitive information such as, for example, one or more keys 22. Processor 14, temperature security module 16, security controller 18, power module 24, memory 26, and other modules 28 may each be bidirectionally coupled to interconnect 12. Processor 14, power module 24, memory 26, and other modules 28 include an internal power supply node which is coupled to receive a first power supply voltage, Vdd. This power supply voltage may be provided, for example, by power module 24. Temperature security module 16 provides a temperature tamper signal to security controller 18.

System 10 may be an SoC which can be used for any type of product or device. System 10 operates in a variety of deployment modes throughout its lifetime. Initially, system 10 is manufactured by a manufacturer. Therefore, a first deployment mode indicates that system 10 has not yet left the manufacturer. After manufacture, it is sent to a customer which may integrate the SoC into a larger system or product. The customer may program secure information into system 10, such as into secure storage circuitry 20. Furthermore, as will be described in more detail below, trim values may be programmed into temperature security module 16. After the programming of the secure information and trim values, operating power is no longer provided to system 10 and a battery, such as a coin battery, supplies power (Vbatt) to temperature security module 16, security controller 18, and secure storage circuitry 20. This is referred to as a second deployment mode. The final product may then be deployed by the customer to the field. Deployment to the field includes transportation and storage of the product which includes system 10. A third deployment mode indicates that system 10 is in use in the field. Until system 10 is in use in the field, system 10 may be considered to be in a "shelf mode" and upon entering the field, system 10 is placed in "operating mode" in which system 10 is no longer in shelf mode.

Referring to system 10 of FIG. 1, temperature security module 16 monitors the temperature of system 10 to determine when the temperature has gone beyond a valid temperature range. If temperature security module 16 determines that the temperature of system 10 has gone below a lower bound of the valid temperature range or above an upper bound of the valid temperature range, temperature security module 16 asserts the temp tamper signal to indicate that the temperature of system 10 has gone beyond the acceptable temperature range which provides a warning that system 10 may have been hacked or been vulnerable to being hacked. In response to assertion of the temp tamper signal, security controller 18 may take appropriate action, such as clear keys 22 and any other information stored within secure storage circuitry 20. Prior to use of system 10 in the field, though, such as during shipping or being stored prior to use in the field, system 10 may be exposed to extreme temperatures which would typically result in assertion of the temp tamper signal. Therefore, prior to use in the field, system 10 may be maintained in a shelf mode. While in shelf mode, system 10 is in a low power mode in which system 10 is only powered by a battery, such as a coin battery. In the illustrated example, only temperature security module 16, security controller 18, and secure storage circuitry 20 within the battery domain are powered during the low power mode. Furthermore, during shelf mode, a temperature range larger than the valid temperature range is used in determining whether or not to assert the temp tamper signal. When system 10 is deployed for use in the field, shelf mode is disabled so that system 10 enters the normal operating mode in which the valid temperature range is used. In order to maintain security, once shelf mode is disabled, it cannot again be re-enabled.

Note that security controller 18 may receive other security related signals, aside from temperature monitoring, from within system 10 and take similar action when a hacking is possible. For example, voltage and currents may be monitored by other modules within system 10 and provide information to security controller 18 accordingly.

Figure 2:
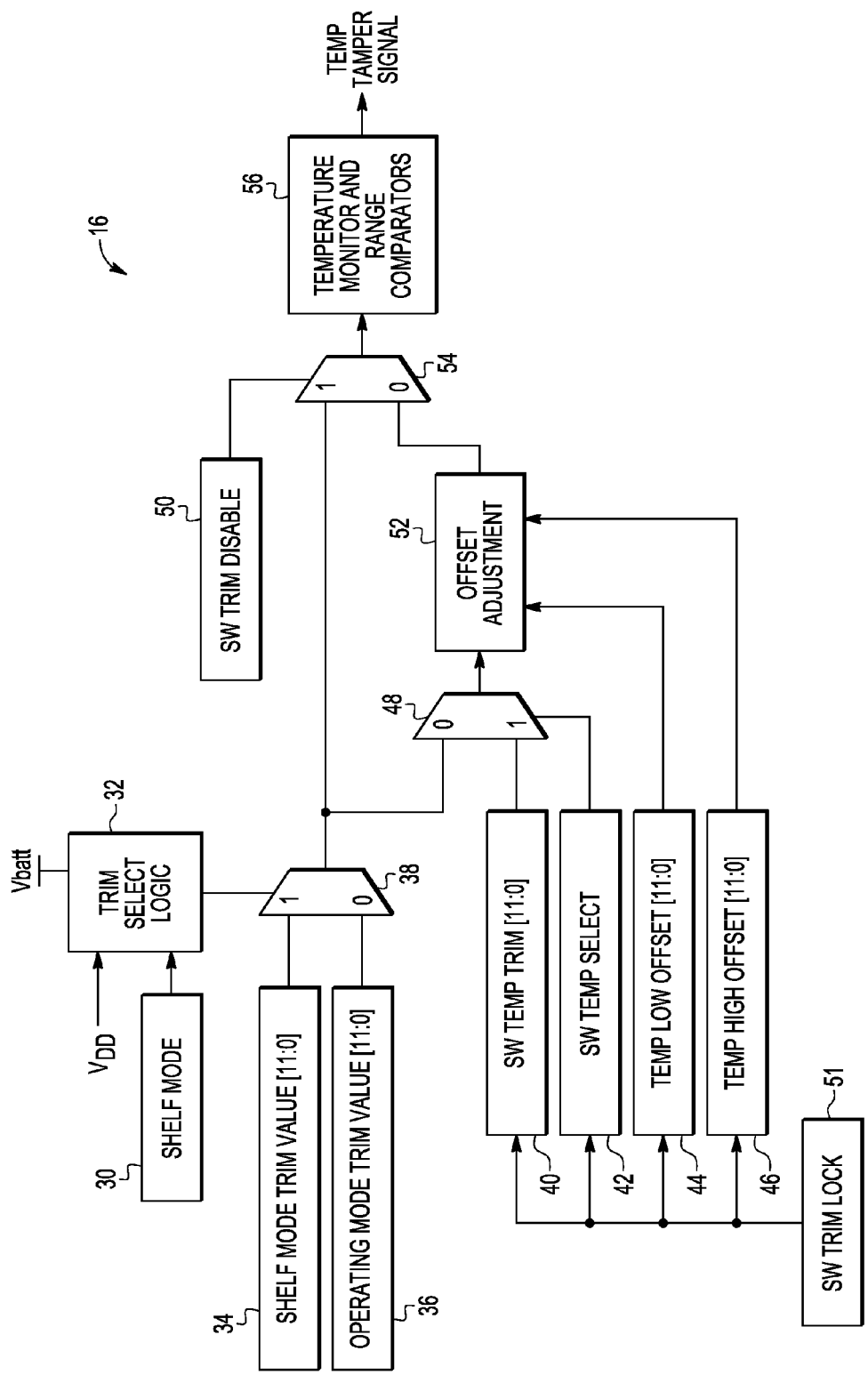
FIG. 2 illustrates, in block diagram form, a portion of the temperature security module of FIG. 1 in accordance with one embodiment of the present invention.

FIG. 2 illustrates in block diagram form a portion of temperature security module 16. Temperature security module 16 includes storage circuitry configured to store a shelf mode trim value 34, an operating mode trim value 36, a shelf mode indicator 30, a software temperature trim value 40 (also referred to as a programmable temperature trim value), a software select value 42, a temperature low offset value 44, a temperature high offset value 46, a software trim disable indicator 50, and a software trim lock 51. Temperature security module 16 also includes multiplexers (MUXes) 38, 48, and 54, trim select logic 32, offset adjustment logic 52, and a temperature monitor and range comparators 56. Trim select logic 32, offset adjustment 52, and temperature monitor and range comparators are coupled to the battery power supply node to receive Vbatt. Trim select logic is coupled to the Vdd power supply node and coupled to receive shelf mode indicator 30. A first data input of MUX 38 is coupled to receive shelf mode trim value 34, a second data input of MUX 38 is coupled to receive operating mode trim value 36, and a control input of MUX 38 is coupled to an output of trim select logic 32. A first data input of MUX 48 is coupled to an output of MUX 38, a second data input of MUX 48 is coupled to receive SW temp trim value 40, and a control input of MUX 48 is coupled to SW temp select 42. Offset adjustment 52 is coupled to an output of MUX 48, and is coupled to receive temp low offset value 44 and temp high offset value 46. A first data input of MUX 54 is coupled to the output of MUX 38, a second data input of MUX 54 is coupled to an output of offset adjustment 52, and a control input of MUX 54 is coupled to SW trim disable indicator 50. Temperature monitor and range comparators 56 is coupled to an output of MUX 54 and provides a temperature tamper signal (also referred to as the temp tamper signal).

In one embodiment, shelf mode indicator 30 is a one time programmable element, such as a fuse, in which initially (e.g. prior to programming the fuse) shelf mode indicator 30 is unprogrammed and indicates shelf mode is enabled. In one embodiment, shelf mode trim value 34, operating mode trim value 36, and SW trim disable value 50 are one time programmable elements, such as fuses. In one embodiment, SW temp trim value 40, SW temp select value 42, temp low offset value 44, temp high offset value 46, and SW trim lock 51 are one time programmable until power on reset (POR) elements. That is, they can only be written once after each POR, unlike a one time programmable element which can only be written once ever. In one example, each of these programmable until POR elements are defaulted to a logic level zero upon a POR. Furthermore, since these elements are within the battery power domain of Vbatt, the battery needs to be removed and re-applied to allow these elements to be programmed again.

In operation, temperature monitor and range comparators 56 monitor a temperature of system 10 to determine whether the temperature has fallen outside the valid temperature range. Comparators within temperature monitor and range comparators 56 receive a temperature of system 10 from the temperature monitor and compare the results to references provided by a reference generator, such as a bandgap reference generator. The references are therefore used to provide an upper and lower bound of a temperature range. If a comparator determines that the temperature falls beyond an upper bound or lower bound provided by the references, the temp tamper signal is asserted, indicating that the temperature has fallen below or risen above a valid temperature range in which safe operation can be guaranteed. Assertion of the temp tamper signal may be in indication that SoC 10 has been hacked.

Operation of the temperature monitor and comparators of temperature monitor and range comparators 56 may be adjusted through the use of trim values. A trim value is provided from the output of MUX 54 to temperature monitor and range comparators 56. The trim value is determined based on the control inputs to MUXes 38, 48, and 54. The trim value, prior to being provided to temperature monitor and range comparators 56, may also be adjusted by offset adjustment 52. In one embodiment, shelf mode indicator 30, prior to being programmed, defaults to indicate that shelf mode is enabled for system 10. If shelf mode indicator 30 indicates shelf mode is enabled and no power is detected at the Vdd power supply node, trim select logic 32 selects the first input of MUX 38 such that shelf mode trim value 34 is provided as the output of MUX 38. Also, with SW temp select 42, offset values 44 and 46, and SW trim disable 50 defaulted to a logic level zero upon a POR, shelf mode trim value 34 is provided via MUX 48, offset adjustment 52, and MUX 54 to temperature monitor and range comparators 56. Offset adjustment 52 does not modify shelf mode trim value 34 since offsets 44 and 46 are zero. Note that if shelf mode indicator 30 indicates shelf mode is enabled and power is being supplied to the Vdd power supply node, trim select logic 32 selects the second input of MUX 38 such that operating mode trim value 36 is provided as the output of MUX 38. To exit shelf mode, shelf mode indicator 30 is programmed to disable shelf mode. For example, the fuse can be programmed to disable shelf mode. Upon shelf mode being disabled, system 10 enters operating mode.

In operating mode, trim select logic 32 selects the second input of MUX 38 such that operating mode trim value 36 is provided as the output of MUX 38. Depending on the value programmed into SW temp select 42, either operating mode trim value 36 or SW temp trim value 40 is provided as the output of MUX 48 to offset adjustment 52. Offset adjustment 52 uses offset values 44 and 46 to adjust the received trim value (one of operating trim value 36 or SW temp trim value 40) and provides the resulting trim value to the second input of MUX 54. If SW trim is not disabled (if SW trim disable 50 is a logic level zero), the resulting trim value is provided to temperature monitor and range comparators 56. However, if SW trim is disabled, then regardless of the values of SW temp select 42 and offsets 44 and 46, operating mode trim value 36 is provided, via the first input of MUX 54, to temperature monitor and range comparators 56. Operation of temperature security module 18 will be described in more detail in reference to the temperature ranges of FIG. 3.

Figure 3:
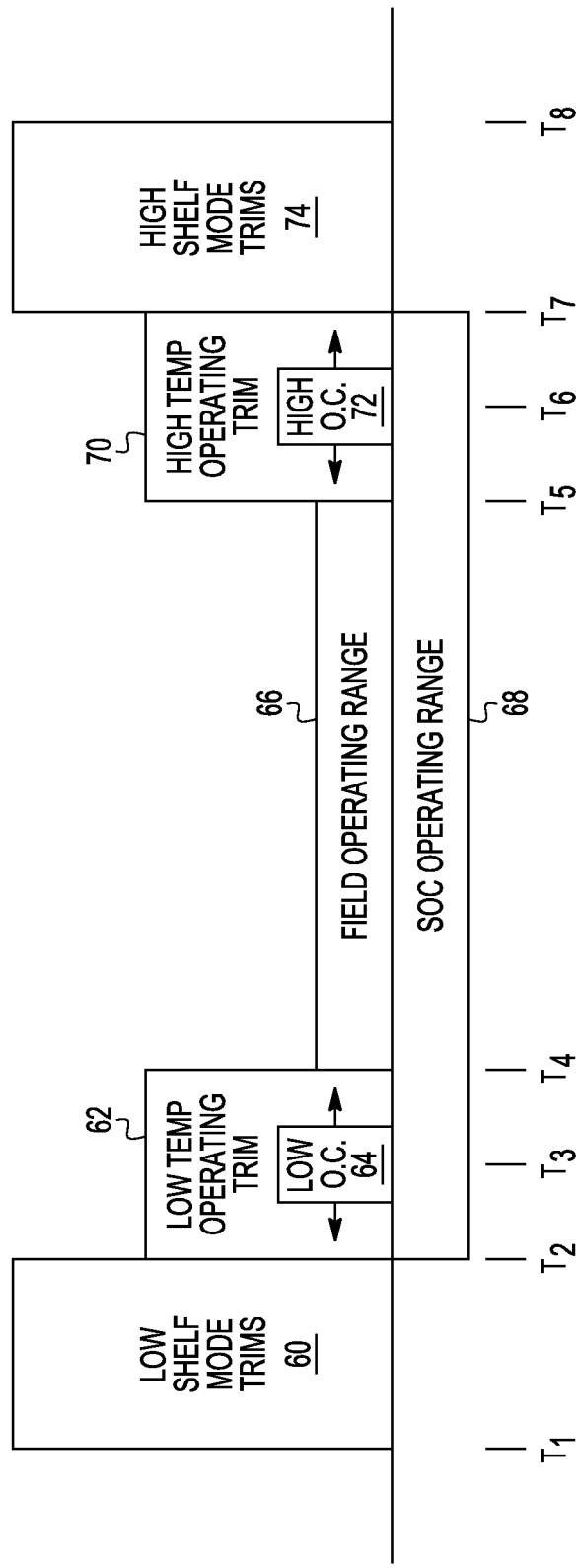
FIG. 3 illustrates, in diagrammatic form, various temperature ranges for the data processing system of FIG. 1.

FIG. 3 illustrates various temperature ranges for system 10. An SoC manufacturer typically guarantees proper operation in a valid operating range, such as field operating range 66 between temperatures T4 and T5. For example, T4 may be −20 degrees Celsius and T5 may be 120 degrees Celsius. Any temperature of SoC 10 which falls within range 66 between T4 and T5 is considered safe and the temp tamper signal is not asserted. During operating mode, when the temperature of SoC 10 falls outside of an SoC operating range 68 (is either less than T2 or greater than T7), the temp tamper signal is asserted. For example, T2 may be −40 degrees Celsius and T7 may be 140 degrees Celsius. For a given SoC, based on the operation of the temperature monitor and range comparators 56, the temp tamper signal is asserted when the temperature of SoC falls below a particular temperature between T2 and T4 of low temp range 62 or rises above a particular temperature between T5 and T7 of high temp range 70. The particular temperature in range 62 or in range 70 which results in assertion of the temp tamper signal corresponds to a comparator trip point of temperature monitor and range comparators 56.

Process variations across SoCs within a lot or among various lots result in differences in the particular temperature between T2 and T4 and the particular temperature between T5 and T7 which provides the trip point of the comparator. Therefore, through testing of various parts, the manufacturer is able to determine a Gaussian distribution between T2 and T4 with a mean at center point T3, corresponding to range 62, indicating the probability at each temperature that a particular SoC will assert the temp tamper signal for falling below range 66. Similarly, a Gaussian distribution can be determined between T5 and T7 within a mean at center point T6, corresponding to range 70, indicating the probability at each temperature that a particular SoC will assert the temp tamper signal due to rising above range 66. This probability distribution results from the process variations in temperature monitor and range comparators 56. Therefore, ranges 62 and 70 provide a level of uncertainty as to at which temperature within each range the temp tamper signal will be asserted. It is desirable to make these distributions as tight as possible, thus reducing ranges 62 and 70, which reduces the range of uncertainty as to the temperature between T2 and T4 and the temperature between T5 and T7 which will result in assertion of the temp temper signal.

Therefore, through testing, the manufacturer can determine trim values for temperature monitor and range comparators 56 which can counter the effects of process variation and thus reduce the width of ranges 62 and 70 as much as possible. Ideally, the trim values should be chosen such that T4 is equal to T2 and T5 equal to T7, or that they are at least as close as possible to each other. The closer T4 is to T2 and the closer T5 is to T7, the higher the accuracy provided by temperature monitor and range comparators 56 and the greater the width of field operating range 66 in which the temp tamper signal will not be asserted. It is desirable to make the width of range 66 as great as possible within SoC operation range 68 so that a manufacturer can guarantee proper operation to a customer over a larger temperature range. These trim values can be programmed by the manufacturer on each SoC to allow for the greatest valid temperature range of the device. These trim values correspond to operating mode trim value 36 in system 10 of FIG. 2.

In one embodiment, operating mode trim value 36 includes a low operating mode trim value and a high operating mode trim value. For example, operating mode trim value 36 may be a 12 bit value in which 6 bits affect the comparison at the low end of field operating range 66 and 6 bits affect the comparison at the high end of field operating range 66. That is, 6 bits result in reducing the width of range 62 by moving T4 closer to T2 and the other 6 bits result in reducing the width of range 70 by moving T5 closer to T7.

However, a customer of system 10 may wish to change or restrict the temperature boundaries provided by the manufacturer of system 10. For example, for operating mode, a customer may wish to provide a smaller valid temperature range than provided by operating mode trim value 36. In one embodiment, a customer may program its own trim value corresponding to each of the high end and low end of field operating range 66. In this case, the customer, based on its own testing and evaluation, may program a software temperature trim value 40 into system 10 and then program SW temp select 42 to a logic level 1 so as to allow MUX 48 to select SW temp trim value 40 rather than operating mode trim value 36. SW temp trim value 40 may represent the customer's attempt to cancel out process variations and tighten the Gaussian distributions of ranges 62 and 70. Similar to operating mode trim value 36, SW temp trim value 40 may include a high SW temp trim value and a low SW temp trim value. For example, it may be a 12 bit value in which 6 bits affect the comparison at the low end of field operating range 66 and 6 bits affect the comparison at the high end of field operating range 66.

Furthermore, regardless of which trim value (36 or 40) is selected by the customer with SW temp select 42, the customer may program a temp low offset 44 and a temp high offset 46. These values are used by offset adjustment 52 during operating mode to generate an adjusted trim value based on the trim value received from MUX 48. Each offset value may be a 2-bit value in which each of the 4 possible 2-bit combinations corresponds to a particular temperature offset. For example, 0b00 may correspond to no change to the trim value, 0b01 may correspond to an addition of a first predetermined amount to the trim value, 0b10 may correspond to an addition of a second predetermined amount greater than the first amount to the trim value, and 0b11 may correspond to a subtraction of a predetermined amount from the trim value. In one embodiment, adjustment of the trim values with the offsets corresponds to shifting the center point of the Gaussian distributions of ranges 62 and 70. For example, temp low offset 44 may be used to modify the 6 bits which affect the comparison at the low end of range 66, and high temp offset 46 may be used to modify the 6 bits which affect the comparison at the high end of range 66. In one embodiment, the offset values may only be used to further restrict the valid temperature range. Therefore, a customer has the option to override trim values programmed into one time programmable memory by the manufacturer through the use of SW trim value 40, and offsets 44 and 46.

In one embodiment, a customer may decide not to override operating mode trim value 36 and may therefore assert SW trim disable 50 by, for example, programming a fuse. In this case, during operating mode, operating mode trim value 36 is provided to temperature monitor and range comparators 56 without any modification by way of MUXes 38 and 54. That is, with SW trim disable indicator 50 asserted, SW temp trim value 40, SW temp select 42, and offsets 44 and 46 do not affect operating mode trim value 36 being provided to temperature monitor and range comparators 56. In one embodiment, the software trim values can be locked or disabled to prevent updates to any of SW temp trim value 40, SW temp select 42, and offsets 44 and 46. For example, SW trim lock 51 initially defaults to being negated (e.g. a first logic state) so as to allow updates to any of these values by the customer. However, SW trim lock 51 may be written to once after reset, in which, once asserted (e.g. written to a second logic state), changes to any of these values is prevented. Upon removal and reapplication of the battery which provides Vbatt, the lock indicator is defaulted back to being negated, thus again allowing changes to the SW temp trim value.

As discussed above, prior to entering normal operation, system 10 may be subjected to temperatures outside of range 68 in which the temperature falls below T2 or above T7. For example, during shipping of system 10 from the manufacturer to the customer, or while system 10 is in storage or transportation by the customer during deployment before being placed for use in the field, temperatures may reach values outside of range 68. Therefore, system 10 is initially placed in shelf mode in which system 10 operates in a low power mode using Vbatt, as discussed above, and temperatures are allowed to fall outside of SoC operating range 68 without triggering assertion of the temp tamper signal. The manufacturer may therefore also program a shelf mode trim value into the SoC, such as shelf mode trim value 34 of FIG. 2, which are used by temperature monitor and range comparators 56 prior to exiting shelf mode. Shelf mode trim value 34 is provided to temperature monitor and range comparators 56 via MUXes 38 and 48 if SW trim disable 50 is a logic level 0 or via MUXes 38 and 54 if SW trim disable 50 is a logic level 1.

In one embodiment, similar to the operating mode trim value 36, shelf mode trim value 34 includes a low shelf mode trim value and a high shelf mode trim value. For example, shelf mode trim value 34 may be a 6 bit value in which 6 bits affect the comparison at the lower temperature and 6 bits affect the comparison at the higher temperatures. The shelf mode trim value shifts the comparator trip points within temperature monitor and comparators 56 to T2 and T7. In this manner, when in shelf mode and the temperature of the SoC falls into range 60 between T1 and T2 or falls into range 74 between T7 and T8, the temp tamper signal is not asserted as it would be if system 10 were not in shelf mode. In shelf mode, the range of temperatures which do not result in assertion of the temp tamper signal (T1 to T8) is larger than SoC operating range 68. In contrast, upon disabling shelf mode, the temp tamper signal will be asserted at a particular temperature within range 60 or 74.

The trim values provided to temperature monitor and range comparators 56 may affect the temperature ranges in a variety of different ways. For example, the trim values can adjust the reference input of the range comparator against which the temperature value from the temperature monitor is compared. In alternate embodiments, the trim values may be used in different ways to indicate the temperature ranges used to generate the temp tamper signal.

Figure 4:
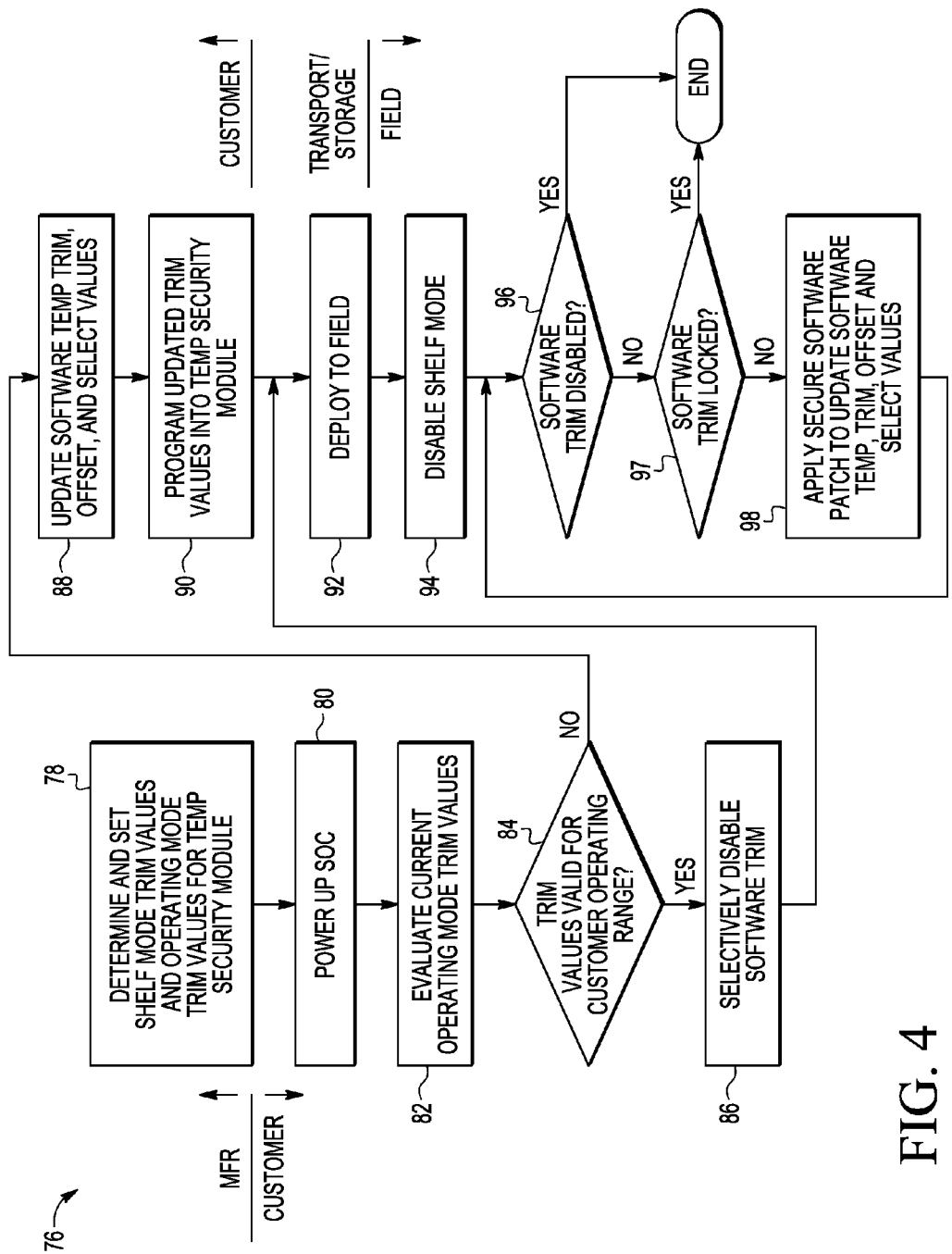
FIG. 4 illustrates, in flow diagram form, a method for adjusting the temperature ranges for the data processing system of FIG. 1.

FIG. 4 illustrates a method 76 for adjusting temperature ranges in accordance with one embodiment of the present invention. Method 76 begins with block 78 in which a manufacturer of a system, such as an SoC, determines and sets shelf mode trim values and operating mode trim values for a temperature security module of an SoC. Block 78 may correspond to the first deployment mode of the system. The manufacturer then ships the system to a customer. Method proceeds to block 80 in which the customer powers up the SoC. As discussed above, the one time programmable upon reset elements of the SoC are brought up to their default values. Also, the shelf mode indicator defaults to indicating that shelf mode is enabled. However, upon power up, power is applied by the customer to the Vdd power supply node, in which case the trim select logic selects the operating mode trim value rather than the shelf mode trim value. The customer, in block 82, may then evaluate the current operating mode trim values originally provided by the manufacturer in one time programmable elements of the SoC. Method 76 proceeds to decision diamond 84 in which it is determined whether the current operating mode trim values are valid for the customer's desired SoC operating range. If so, then method 76 proceeds to block 86 in which the customer may decide whether or not to disable use of software trimming (such as with SW temp trim value 40 or offsets 44 and 46) all together. If the customer disables use of software trimming, then the software trim disable indicator may be programmed accordingly. Method 76 then continues to block 92. If, at decision diamond 84, the current operating mode trim values are not valid for the customer's desired SoC operation range, method 76 proceeds to block 88 in which the customer performs testing to determine appropriate values for the SW temp trim value, SW trim select value, temp low offset, and temp high offset. Then, in block 90, the customer may program the updated values into the temperature security module. In one embodiment, programming of these values needs to be done while in supervisor mode. Also, while the SoC is with the customer, the customer programs secure information, as needed, into secure storage circuitry 20, including keys 22. In one embodiment, the programming of the secure information is performed in supervisor mode by secure software. The customer also integrates the programmed SoC into a product which will be deployed to the field.

Method 76 proceeds to block 92 in which the SoC is deployed to the field by the customer. The deployment to the field typically includes transport and storage of the product which includes the SoC. It is during the transport and storage that the SoC may be exposed to extreme temperatures (temperatures outside of SoC range 68). Note that shelf mode indicator continues to indicate shelf mode, and, prior to use in the field, power is not supplied to the Vdd power supply node. However, the temperature security module, security controller, and secure storage circuitry continue to be powered by Vbatt. Therefore, the SoC is in shelf mode in which the trim select logic selects the shelf mode trim value to be provided to the temperature monitor and range comparators. While in shelf mode, exposure to extreme temperatures will not result in assertion of the temp tamper signal. The deployment to the field in block 92 may correspond to the second deployment mode. Also, while in shelf mode, the security controller prevents access to the secure information in the secure storage circuitry.

Method 76 proceeds to block 94 in which the SoC is deployed for use in the field, and in doing so, shelf mode is disabled. This may be done by programming the fuse which provides the shelf mode indicator. Deployment for use in the field by the customer may correspond to the third deployment mode. With shelf mode disabled, the SoC is placed in operating mode.

During use of the SoC in the field, a customer may determine that a problem exists with the trim values being selected for use by the comparators. If, at decision diamond 96, it is determined that software trim is not disabled, method 76 proceeds to decision diamond 97. If it is determined that software trim is not locked, method 76 proceeds to block 98 in which a secure software patch is applied to update the software temp trim values, offset values, and SW temp select values. Therefore, if there is a problem once the SoC is in use in the field, so long as software trim is not disabled, a reset may be performed in which one time programmable upon POR elements, such as the SW temp trim value, SW temp select value, and offset values can be programmed, by secure software, to new values. Method 76 may then return to decision diamond 96 in which the SoC can continue to be used in the field. At decision diamond 96 or decision diamond 97, if software trim is disabled or locked, nothing can be done to modify the existing trim values and therefore the method ends.

By now it should be appreciated that there has been provided a method for improved temperature monitoring for security. By providing one time programmable upon POR elements for storing programmable trim values, operating mode trim values provided by a manufacturer may be overridden in order to match a customer's need. Furthermore, through the provision of a shelf mode, an SoC may be exposed to out of range temperatures without resulting in a false trigger of the temp tamper signal. In this manner, customers are not discarding parts whose temp tamper signal was asserted due to exposure to extreme temperatures during shipping or storage when likelihood of a hack is very low. Once deployed to the field, though, shelf mode can be disabled so that the SoC is placed in operating mode. For improved security, in one embodiment, once shelf mode has been disabled, it cannot again be enabled.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" or "0b" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Also for example, in one embodiment, the illustrated elements of system 10 are circuitry located on a single integrated circuit or within a same device. Alternatively, system 10 may include any number of separate integrated circuits or separate devices interconnected with each other. For example, memory 26 may be located on a same integrated circuit as processor 14, temperature security module 16, security controller 18, and secure storage circuitry 20, or may be located on a separate integrated circuit or located within another peripheral or slave discretely separate from other elements of system 10.

Although the invention is described herein with reference to specific embodiments, various modifications and changes can be made without departing from the scope of the present invention as set forth in the claims below. For example, different bit formats and bit lengths may be used to store the trim values in security module 16. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

1. In one embodiment, a processing system includes a processor, and a temperature security module coupled to provide a temperature tamper signal to the processor. The temperature security module includes a shelf mode trim value; an operating mode trim value; and a programmable temperature trim value, wherein one of a group consisting of: the programmable temperature trim value, the shelf mode trim value, and the operating mode trim value, is used based on a deployment mode of the processing system to set a temperature monitor trim value. In one aspect, the temperature security module further includes trim select logic configured to select between the shelf mode trim value and the operating mode trim value. In a further aspect, the processing system further includes a programmable temperature trim select indicator configured to select between the programmable temperature trim value, and one of the shelf mode trim value and the operating mode trim value selected by the trim select logic. In another aspect of the above embodiment, a first value of the deployment mode indicates the processing system has not left a manufacturer of the processing system, a second value of the deployment mode indicates the processing system has been integrated in a product, a battery power supply is provided to the temperature security module, secure information has been programmed in the processing system, operating power is not provided to the processing system, and a shelf mode indicator indicates shelf mode, and a third value of the deployment mode indicates the processing system has been placed in use by the customer and the shelf mode indicator does not indicate shelf mode. In another aspect, the shelf mode trim value includes a high shelf mode trim value and a low shelf mode trim value, the operating mode trim value includes a high operating mode trim value and a low operating mode trim value, and the programmable temperature trim value includes a high programmable temperature trim value and a low programmable temperature trim value. In a further aspect, the temperature security module further includes a low temperature offset value that is used to adjust a selected one of the low shelf mode trim value, the low operating mode trim value, and the low programmable temperature trim value, and a high temperature offset value that is used to adjust a selected one of the high shelf mode trim value, the high operating mode trim value, and the high programmable temperature trim value. In yet another aspect of the above embodiment, the temperature security module further includes a programmable trim disable indicator to prevent use of the programmable temperature trim value; a one-time programmable trim value lock indicator to lock the programmable temperature trim value and prevent any changes to the programmable temperature trim value until battery power is removed and applied again to the temperature security module. In a further aspect, the temperature security module further includes a temperature monitor configured to provide the temperature tamper signal when a detected temperature of the processing system is not within a temperature range indicated by the selected one of the programmable temperature trim value, the shelf mode trim value, and the operating mode trim value. In yet another aspect, the shelf mode trim value, the operating mode trim value, and the programmable temperature trim value are different from one another. In yet another aspect, the temperature security module operates on battery power and the battery power is supplied to the temperature security module even when a supply power is not provided to the processor. In a further aspect, the processing system further includes a security controller, wherein the security controller prevents access to the secure information in the processing system when the deployment mode has the second value.

In another embodiment, a processing system includes secure storage circuitry; a security controller; a temperature security module coupled to provide a temperature tamper signal to the security controller; a battery power supply coupled to supply power to the secure storage circuitry, the security controller, and the temperature security module. The temperature security module is configured to select between a shelf mode temperature trim value, an operating mode temperature trim value, and a programmable temperature trim value based on whether a shelf mode indicator indicates the processing system is in shelf mode. In one aspect of the another embodiment, the secure storage circuitry prevents access to secure information in the secure storage circuitry when the shelf mode indicator indicates the processing system is in the shelf mode. In another aspect, the temperature security module further includes a temperature monitor configured to provide the temperature tamper signal when a detected temperature of the processing system is not within a temperature range indicated by a selected one of the programmable temperature trim value, the shelf mode trim value, and the operating mode trim value. In yet another aspect, the shelf mode trim value includes a high shelf mode trim value and a low shelf mode trim value, the operating mode trim value includes a high operating mode trim value and a low operating mode trim value, and the programmable temperature trim value includes a high programmable temperature trim value and a low programmable temperature trim value. In a further aspect, the temperature security module further includes a low temperature offset value that is used to adjust a selected one of the low shelf mode trim value, the low operating mode trim value, and the low programmable temperature trim value, and a high temperature offset value that is used to adjust a selected one of the high shelf mode trim value, the high operating mode trim value, and the high programmable temperature trim value. In another aspect of the another embodiment, the temperature security module selects the shelf mode temperature trim value when operating power supply is not provided to the processing system and the shelf mode indicator indicates the shelf mode.

In yet another embodiment, a method includes providing a processing system on a chip (SOC), wherein the SOC includes a processor and a temperature security module coupled to provide a temperature tamper signal to the processor; configuring the temperature security module to select one of a group consisting of: a shelf mode trim value when the processing system is in shelf mode, an operating mode trim value when the processing system is in operating mode, and a programmable temperature trim value to override a selected one of the shelf mode trim value and the operating mode trim value. In one aspect, the method further includes configuring the temperature security module to disable use of the programmable temperature trim value when the shelf mode trim value is within an expected operating temperature range; and prevent any changes to the programmable temperature trim value until battery power is removed and re-applied to the temperature security module. In another aspect, the method further includes configuring the temperature security module to use at least one of a group consisting of a low temperature offset and a high temperature offset to adjust a selected one of the shelf mode trim value, the operating mode trim value, and the programmable temperature trim value.

What is claimed is:

1. A processing system comprising:
   a processor; and
   a temperature security module coupled to provide a temperature tamper signal to the processor, wherein the temperature security module includes:
      a shelf mode trim value;
      an operating mode trim value; and
      a programmable temperature trim value,
      wherein one of a group consisting of: the programmable temperature trim value, the shelf mode trim value, and the operating mode trim value, is used based on a deployment mode of the processing system to set a temperature monitor trim value, wherein the temperature security module is configured to use one of the programmable trim value or the shelf mode trim value to set the temperature monitor trim value during a first deployment mode in which a battery power supply is provided to the temperature security module, operating power is not provided to the processing system, and a shelf mode indicator indicates shelf mode,
   wherein the temperature security module further includes
      a temperature monitor configured to provide the temperature tamper signal when a detected temperature of the processing system is not within a temperature range indicated by the selected one of the programmable temperature trim value, the shelf mode trim value, and the operating mode trim value.

2. The processing system of claim 1 wherein the temperature security module further includes:
   trim select logic configured to select between the shelf mode trim value and the operating mode trim value.

3. The processing system of claim 2 further comprising:
   a programmable temperature trim select indicator configured to select between the programmable temperature trim value, and one of the shelf mode trim value and the operating mode trim value selected by the trim select logic.

4. The processing system of claim 1 wherein:
   the temperature security module is configured to use the operating mode trim value to set the temperature monitor trim value during a second deployment mode in which operating power is provided to the processing system and the shelf mode indicator indicates shelf mode, and
   the temperature security module is configured to use one of the programmable temperature trim value or the operating mode trim value to set the temperature monitor trim value during a third deployment mode in which the processing system has been placed in used by the customer and the shelf mode indicator does not indicate shelf mode.

5. The processing system of claim 4 further comprising:
   a security controller, wherein the security controller prevents access to the secure information in the processing system when the deployment mode has the second value.

6. The processing system of claim 1 wherein:
   the shelf mode trim value includes a high shelf mode trim value and a low shelf mode trim value,
   the operating mode trim value includes a high operating mode trim value and a low operating mode trim value, and
   the programmable temperature trim value includes a high programmable temperature trim value and a low programmable temperature trim value.

7. The processing system of claim 6 wherein:
   the temperature security module further includes
      a low temperature offset value that is used to adjust a selected one of the low shelf mode trim value, the low operating mode trim value, and the low programmable temperature trim value, and
      a high temperature offset value that is used to adjust a selected one of the high shelf mode trim value, the high operating mode trim value, and the high programmable temperature trim value.

8. The processing system of claim 1 wherein:
   the temperature security module further includes
      a programmable trim disable indicator to prevent use of the programmable temperature trim value; and
      a one-time programmable trim value lock indicator to lock the programmable temperature trim value and prevent any changes to the programmable temperature trim value until battery power is removed and applied again to the temperature security module.

9. The processing system of claim 1 wherein:
   the shelf mode trim value, the operating mode trim value, and the programmable temperature trim value are different from one another.

10. The processing system of claim 1 wherein:
    the temperature security module operates on battery power and the battery power is supplied to the temperature security module even when a supply power is not provided to the processor.

11. A processing system comprising:
    secure storage circuitry;
    a security controller;
    a temperature security module coupled to provide a temperature tamper signal to the security controller;
    a battery power supply coupled to supply power to the secure storage circuitry, the security controller, and the temperature security module,
    wherein the temperature security module is configured to select between a shelf mode temperature trim value and an operating mode temperature trim value when a shelf mode indicator indicates the processing system is in shelf mode, and to select between the operating mode temperature trim value and a programmable temperature trim value when the shelf mode indicator indicates the processing system is not in shelf mode,
    wherein the temperature security module further includes
       a temperature monitor configured to provide the temperature tamper signal when a detected temperature of the processing system is not within a temperature range indicated by a selected one of the programmable temperature trim value, the shelf mode trim value, and the operating mode trim value.

12. The processing system of claim 11 wherein:
    the secure storage circuitry prevents access to secure information in the secure storage circuitry when the shelf mode indicator indicates the processing system is in the shelf mode.

13. The processing system of claim 11 wherein:
the shelf mode trim value includes a high shelf mode trim value and a low shelf mode trim value,
the operating mode trim value includes a high operating mode trim value and a low operating mode trim value, and
the programmable temperature trim value includes a high programmable temperature trim value and a low programmable temperature trim value.

14. The processing system of claim 13 wherein:
the temperature security module further includes
a low temperature offset value that is used to adjust a selected one of the low shelf mode trim value, the low operating mode trim value, and the low programmable temperature trim value, and
a high temperature offset value that is used to adjust a selected one of the high shelf mode trim value, the high operating mode trim value, and the high programmable temperature trim value.

15. The processing system of claim 11 wherein:
the temperature security module selects the shelf mode temperature trim value when operating power supply is not provided to the processing system and the shelf mode indicator indicates the shelf mode.

* * * * *